US008744374B2

(12) United States Patent
Aue et al.

(10) Patent No.: US 8,744,374 B2
(45) Date of Patent: Jun. 3, 2014

(54) METHOD AND APPARATUS FOR DATA COMMUNICATION IN LTE CELLULAR NETWORKS

(75) Inventors: Volker Aue, Dresden (DE); Thomas Fliess, Dresden (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 633 days.

(21) Appl. No.: 12/963,683

(22) Filed: Dec. 9, 2010

(65) Prior Publication Data

US 2011/0143807 A1 Jun. 16, 2011

(30) Foreign Application Priority Data

Dec. 14, 2009 (EP) .................................... 09179085

(51) Int. Cl.
*H04B 7/02* (2006.01)

(52) U.S. Cl.
USPC ..... 455/101; 455/67.11; 455/522; 455/562.1; 375/267

(58) Field of Classification Search
USPC ........... 455/101, 114.2, 103, 296, 560, 562.1, 455/67.11; 375/267
See application file for complete search history.

(56) References Cited

U.S. PATENT DOCUMENTS

| 2005/0220199 | A1* | 10/2005 | Sadowsky et al. | 375/260 |
|---|---|---|---|---|
| 2005/0266902 | A1* | 12/2005 | Khatri et al. | 455/575.7 |
| 2006/0264184 | A1* | 11/2006 | Li et al. | 455/101 |
| 2007/0005749 | A1* | 1/2007 | Sampath | 709/223 |
| 2008/0240280 | A1* | 10/2008 | Li | 375/267 |
| 2008/0273617 | A1* | 11/2008 | Lundby et al. | 375/260 |
| 2009/0046800 | A1* | 2/2009 | Xu et al. | 375/267 |
| 2009/0069057 | A1 | 3/2009 | Haartsen et al. | |
| 2009/0231196 | A1 | 9/2009 | Niu et al. | |

FOREIGN PATENT DOCUMENTS

WO 2008/118921 A2 10/2008

* cited by examiner

*Primary Examiner* — Yuwen Pan
*Assistant Examiner* — Fatuma Sherif
(74) *Attorney, Agent, or Firm* — SpryIP, LLC (57) ABSTRACT

Methods and apparatus for uplink data transmission in a Long Term Evolution (LTE) compliant communication system use beam-forming in the uplink to increase the range of LTE compliant wireless communication terminals. Methods are provided for steering the beam in an optimal direction towards the base station, both for time division duplex (TDD) and frequency division duplex (FDD) communication schemes.

13 Claims, 6 Drawing Sheets

Array factor for lambda/2 element spacing, 0 deg phase shift.

Fig. 2

Array factor for lambda/2 element spacing, 180 deg phase shift.

METHOD AND APPARATUS FOR DATA COMMUNICATION IN LTE CELLULAR NETWORKS

CROSS REFERENCE TO RELATED APPLICATIONS

This application claims priority of European Patent Application No. 09179085.7 filed on Dec. 14, 2009, the entire disclosure of which is hereby incorporated herein by reference.

FIELD AND BACKGROUND OF THE INVENTION

The present invention relates to a method for uplink data transmission in a Long Term Evolution (LTE) compliant communication system which comprises a base station and at least one wireless communication terminal. The invention further relates to a wireless communication terminal and to a base station in a Long Term Evolution (LTE) compliant communication system, in particular employing a frequency division duplex (FDD) transmission scheme.

Cellular systems are used to offer wireless telephony and data services to their users. The new cellular standard developed by the 3rd generation partnership program (3GPP) called Long Term Evolution (LTE) offers unprecedented data rates and unprecedented shortest latency to the end customer while promising a high spectral capacity for the network operator. This allows a network operator to make best use of the available spectrum while at the same time providing internet experience similar to wired internet to the end-customer.

An important parameter for any wireless system is the received energy per bit and the corresponding signal-to-noise ratio (SNR). For a fixed transmit power, obviously, as the bit rate increases, the energy per bit decreases. In cellular communications systems, uplink (from a terminal to a base station) and downlink (from a base station to a terminal) transmit power is typically asymmetric. Base stations can transmit with virtually any output power that the system needs for providing good coverage. For mobile terminals, residential gateways and the like, on the other hand, transmit power is limited due to implementation cost, power consumption and regulatory reasons. Therefore, cellular communications tend to be uplink limited, i.e. the coverage area is determined by the uplink rather than the downlink. This is true for any cellular system be it for mobile or fixed wireless access.

Currently, network operators plan to use LTE technology to provide wireless broadband access to houses, in particular in rural areas. For rural areas, however, as the population density is relatively low, providing a good coverage is crucial for lowering network deployment cost.

The LTE system, as already its predecessor UMTS, can adapt the modulation and bit rate to the channel conditions. A user that is far from a base station needs to transmit with a significantly higher energy per bit than a user that is nearby. As the maximum transmit power is limited, increasing the transmitted bit energy can be achieved by either lowering the data rate or by using a more energy efficient modulation scheme, e.g. QPSK instead of 16-QAM or a combination of both methods. The drawbacks of this are that an energy efficient modulation is not bandwidth efficient, i.e. a user that is located at the cell edge requiring an energy efficient modulation scheme consumes significantly more bandwidth than a less energy efficient albeit more bandwidth efficient technique would take. The bit rate can of course be lowered but only to the extent that the bit rate rests above a certain minimum that is acceptable by the user, and that the network has set itself as a minimum quality of service (QoS) limit. For symmetric traffic like voice over IP (VoIP) sacrificing uplink capacity can be more difficult. Therefore, a good uplink performance is crucial for cell coverage and likewise for uplink capacity. Larger cell coverage on the other hand can substantially reduce network deployment cost as less base stations need to be deployed.

As discussed above, the maximum transmitter output power is limited for mobile terminals and residential gateways and is substantially less than the limits for base stations defined by the regulator.

For the purpose of the invention the terms "terminal" and "user equipment" (UE) are intended to refer to any device used directly by an end-customer for wireless communication, such as a hand-held telephone, a communication device in a vehicle or in a laptop computer, a location fixed residential gateway or the like. The UE connects to the base station to provide wireless communication for the user.

Beam-forming techniques are known to enhance downlink performance of cellular networks. Beam-forming is a technique in which multiple antennas transmit the same signal with a phase offset. By doing so, the signals radiated from the different antennas add constructively or destructively depending on the phase of the signal with respect to the transmission angle. By carefully controlling the phase of the antennas, a beam can be formed, where the term "beam" typically refers to the direction into which signals add constructively. In the direction of the beam, the gain can be as high as N, where N is the number of antenna elements.

As an example, consider the use of four equal omni-directional antennas with equal output power. The total emitted output power will be four times the output power of one antenna. If the phases are correctly adjusted such that all signals add constructively for one specific direction, a beam is formed. The output power in the direction of the beam will be 16 times higher compared to a single isotropic radiating antenna element.

Figure 1:
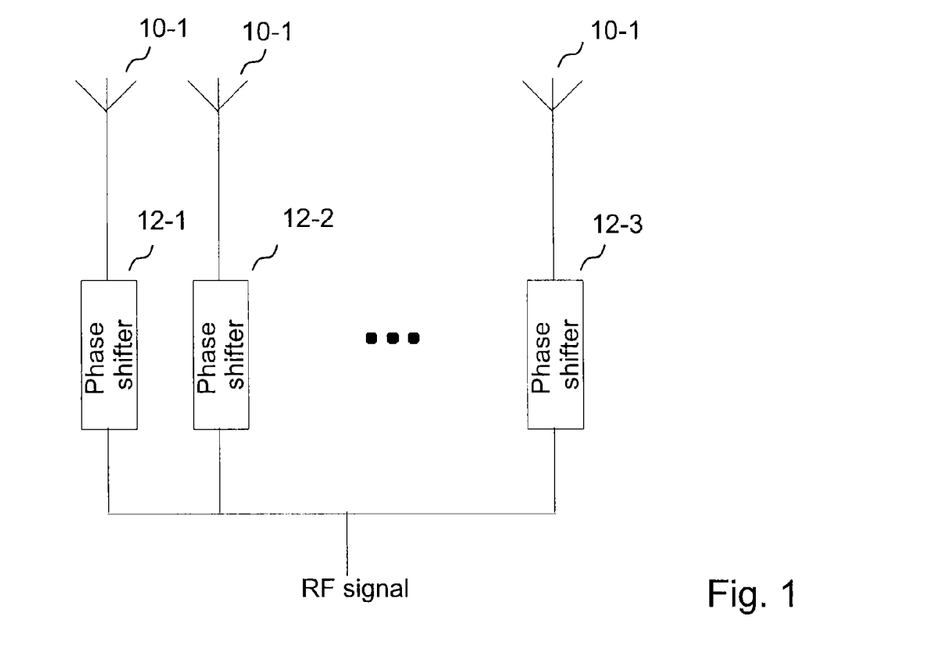
FIG. 1 shows a linear phased antenna array as known from prior art.

Beam-forming techniques are known and have been deployed for years, e.g. for radar. These techniques are often based on antenna arrays, as shown in FIG. 1. An antenna array consists of two or more antennas (10-1, 10-2, ..., 10-$n$) that are located on a geometrical grid. Beam-forming is achieved by sending or receiving the same signal with a different phase. For narrow band signals, a phase shifter (12-1, 12-2, ..., 12-$n$) is used. A beam is formed in directions where the individual signals from each antenna add constructively. Since the behavior of the channel is similar for both directions, the same also holds true for the reception of an RF signal.

The technique was first used in military and radar communications where mechanical, i.e. rotating antennas were replaced with a phased antenna array to steer the beam electronically rather than mechanically. As an alternative to analog phase shifters, phase shifting can also be applied in the digital domain. In this case, separate RF signals with a phase shift already applied are generated and fed to each transmitting antenna, individually. Again, by varying the phase, different beam patterns can be generated.

Figure 2:
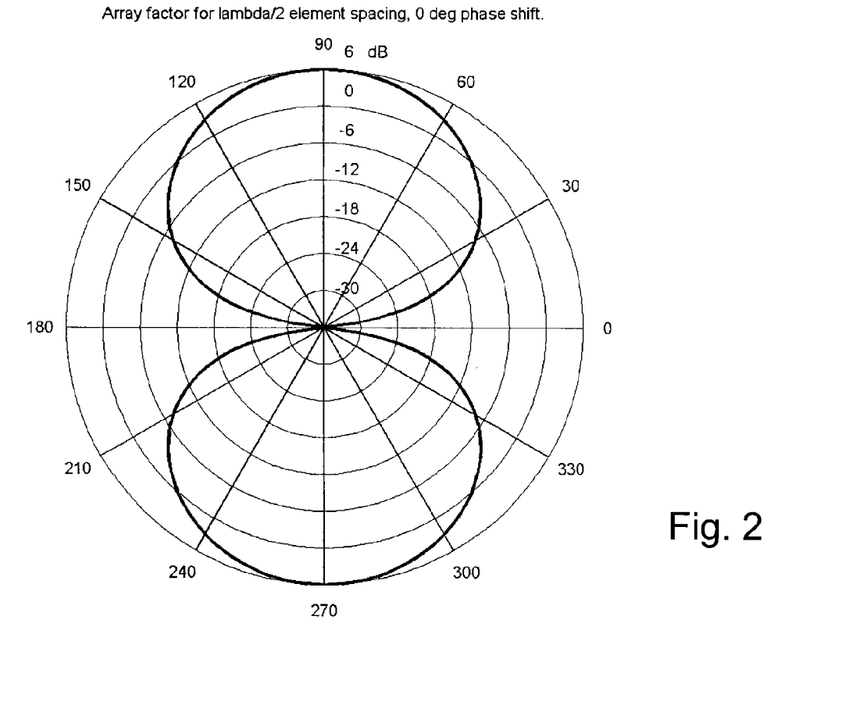
FIG. 2 shows an antenna pattern for two dipole antennas with lambda/2 spacing and zero degree phase shift as known from prior art.

FIG. 2 shows an antenna pattern for two dipole antennas with half lambda spacing and zero degree phase shift, where lambda is the wavelength. The two transmit antennas are located at the horizontal axis. It can be seen from FIG. 2 that the two transmit signals add constructively along the vertical axis. In fact, a 6 dB gain over a single dipole antenna can be observed. As the spacing between the two antennas is one-half the wavelength, the signals of the two antennas add destructively along the horizontal axis if no phase shift is applied.

Figure 3:
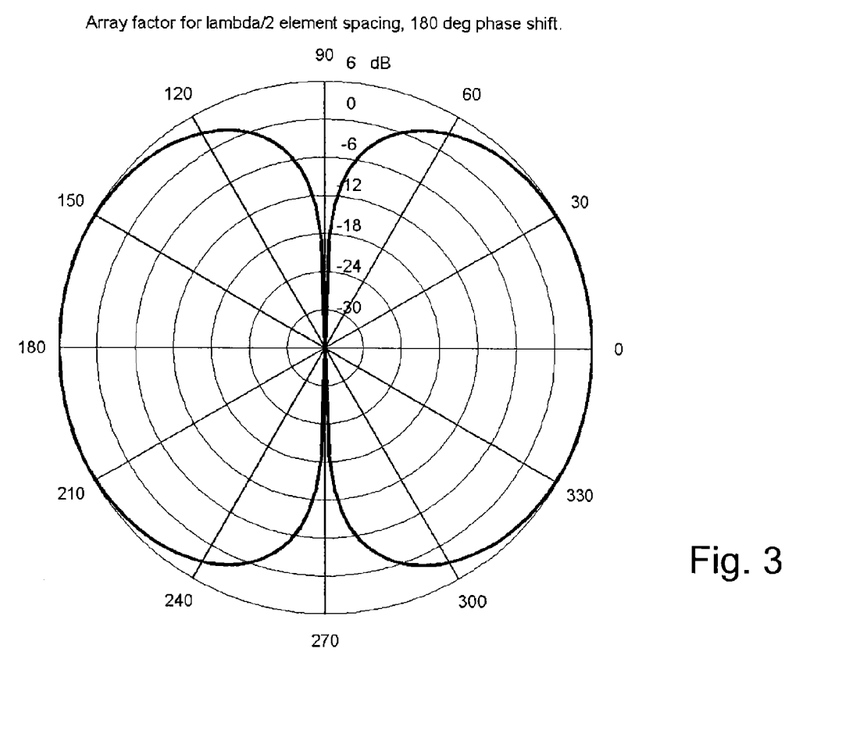
FIG. 3 shows an antenna pattern for two dipole antenna with lambda/2 spacing and 180 degree phase shift as known from prior art.

By applying a relative phase change to one of the antennas with respect to the other, the pattern can be changed. FIG. 3 shows the antenna pattern for the same antenna configuration but with a phase shift of 180 degrees applied to one of the two antennas. Now, the signals add constructively along the horizontal axis and destructively along the vertical axis. Again, a maximum gain of 6 dB over a single dipole antenna can be observed.

Usually, the antennas in such arrays are spaced by lambda/2. A smaller spacing of the antennas reduces the gain from interference and hence the yield of the array. With a larger spacing than lambda/2 so called grating lobes occur, in other words, more than one direction is preferred, wherein such grating lobes either present a gain. Generally, antenna arrays with lambda/2 spacing are preferred in the art, but other configurations are feasible. Details on beam-forming with antenna arrays are widely found in literature.

Beam-forming techniques are now also used in cellular technology. Third generation cellular phone standards UMTS and HSDPA as well as the new standard LTE support beam-forming in the downlink, i.e., from the base station to the mobile. The mobile phone supports these techniques by providing feedback information to the base station which then can adjust the beam accordingly. Moreover, beam-forming is used to adapt antennas of base stations e.g. to geographical or traffic conditions or local requirements.

LTE is the latest cellular standard defined by the 3rd generation partnership program (3GPP). It uses orthogonal frequency division multiple access (OFDMA) in the downlink and single carrier frequency division multiple access (SC-FDMA) in the uplink. Information blocks are placed in transport blocks. When the base station has granted transmission for a specific subframe, the terminal sends exactly one subframe. The subframe with a duration of 1 ms consists of two slots of 0.5 ms each. For uplink transmissions, it is possible for the base station to assign two frequencies blocks to the terminal, one to be used during the first slot of a subframe and the other to be used for the second slot of the subframe.

In the current revision of the LTE standard, i.e. Release 8, beam-forming techniques are supported in the downlink. In order to reduce interference to other base stations LTE makes use of uplink power control, like already the UMTS technology. Power control information is sent within every subframe. The base station controls uplink transmit power of a terminal with the aim to receiving a respective user equipment signal with the bare minimum signal strength required for error-free detection of the signal. In case the signal strength is too low, LTE uses a hybrid automated repeat request (HARM) technique to combine the information of a previous transport block with a repeated version. Additionally, if conditions persist, the base station requests the user equipment to increase its power.

Furthermore the current revision 8 of LTE standard assumes that a terminal may have more than one transmit antenna but only one power amplifier. The base station can trigger the terminal to switch to another transmit antenna via downlink control channel signalization.

In order to optimize the utilization of cell capacity the base station needs to gather some information about the uplink channel quality from each terminal connected to that base station. The individual channel quality may vary in function of the frequency. In TDD systems, channel quality information can be derived by exploiting channel reciprocity provided that the same antennas are used for transmit and receive.

However, in FDD systems, quality information for data transmissions can only be derived for subbands allocated to a terminal. Hence, an additional mechanism has been introduced to LTE uplink. Terminals are configured to periodically send sounding reference signals (SRS). The base station performs measurements on SRS originating from different terminals, and schedules terminals such that service quality and cell utilization are optimized.

It is an object of the present invention to provide apparatus and methods for increasing the range of LTE user equipment.

SUMMARY OF THE INVENTION

According to the invention there is provided a method for uplink data transmission in a Long Term Evolution (LTE) compliant communication system which comprises a base station and at least one wireless communication terminal, wherein the base station transmits individual power control signals to each of the at least one terminal to control uplink transmit power of the at least one terminal to a minimal power required for error-free detection of the uplink signal, and wherein the at least one terminal comprises a modem including an RF front-end, a baseband unit, and at least two antennas, the modem being adapted to support simultaneous reception over the at least two antennas. The uplink data transmission method of the invention is characterized in that the modem is further adapted to support simultaneous transmission over the at least two antennas, and in that the method comprises: defining a first uplink transmission direction for transmitting traffic data; generating an uplink transmission signal; emitting the uplink transmission signal in a beam pattern with the beam directed towards the first uplink transmission direction by feeding the uplink transmission signal as a first transmit signal Tx1 to a first antenna of the terminal, generating a second transmit signal Tx2 as a phase shifted version of the first transmit signal and feeding the second transmit signal to a second antenna of the terminal, wherein the phase shift of the second signal is adapted such that the first and second signals emitted by the first and second antennas, respectively, combine constructively to form a beam pattern with the beam directed towards the first uplink transmission direction.

According to one embodiment of the inventive method, the step of generating the second transmit signal Tx2 comprises multiplying the first signal with a complex exponential following a cyclic prefix adding step in the baseband unit of the terminal.

According to another embodiment of the inventive method, the step of generating the second transmit signal Tx2 comprises multiplying a signal output from a resource mapping step in the baseband unit of the terminal by a phase vector of the form $p=[e^{j\Phi_0}, e^{j\Phi_1}, \ldots, e^{j\Phi_{N-1}}]$ prior to an IDFT generation step, wherein N is the size of the IDFT.

In a first embodiment that uses a time division duplex (TDD) communication scheme the first uplink transmission direction for transmitting traffic data may be defined as the main direction of a signal received from the base station. This can be done under the assumption that the base station uses the same antennas for transmit and receive.

In another embodiment the inventive method may further comprise the steps of: defining a second uplink transmission direction; determining a transmission quality metric from performance characteristics for the first and the second uplink transmission directions; and evaluating the transmission quality metrics by the base station and/or by the terminal in function of the uplink transmit power dictated by the base station, and if the metric for the second uplink transmission direction is better than the metric for the first uplink transmission direction, replacing the first uplink transmission direction by the second uplink transmission direction and starting to transmit traffic data towards the second uplink transmission direction.

The step of determining a transmission quality metric may comprise calculating a metric from code rate, bit rate and modulation scheme in the wireless communication terminal; and the method may further comprise storing the metrics together with the associated transmit power dictated by the base station in a data base of the terminal. In this embodiment, the evaluating step may comprise comparing a metric to transmit power ratio for the first and second uplink transmission direction and selecting that direction for transmitting traffic data for which this ratio is lowest.

This method is advantageously employed with a frequency division duplex (FDD) communication scheme. It can also be employed with a time division duplex (TDD) communication scheme, with potentially less complexity than estimating the direction of the base station from the downlink signal received which, anyway, does only work in a case where the base station uses the same antennas for transmitting and receiving.

In a modification, the method described above may further comprise the step of randomly selecting said first and second uplink transmission directions from a set of uplink transmission directions defined by a set of beam-forming phase vectors, wherein beam-forming vectors that have shown quality metrics to transmit power ratios are assigned a higher likelihood in the random selection process.

In another modification, the method described above may further comprise the steps of predefining a set of uplink transmission directions by a set of beam-forming vectors, sorting the beam-forming vectors according to an increasing or decreasing angle, and randomly or alternating selecting a new beam-forming vector for said second uplink transmission direction from the two nearest neighbors of said first uplink transmission direction.

In yet another modification of the method described above, selecting said second uplink transmission direction may comprise iteratively determining a beam-forming phase vector by calculation using an angular parameter; slightly modifying said angle from one iteration to the next; and, depending on the resulting regulated transmit power, further increasing or setting back and then decreasing the angle.

The invention further provides a wireless communication terminal which is adapted to perform the method for uplink data transmission described above. In particular, the LTE compliant terminal according to the invention comprises a modem including an RF front-end and a baseband unit, and at least two antennas, wherein the baseband unit includes a downlink receiver, an uplink transmitter, at least one controller, and wherein the modem is adapted to support simultaneous reception over the at least two antennas. According to the invention, the modem further comprises at least two transmit paths to support simultaneous transmission over the at least two antennas, and phase shifting means.

The phase shifting means may comprise a multiplier connected between a cyclic prefix adder and a second output of a dual uplink transmitter of the baseband unit of the modem. In a preferred embodiment of the invention, the phase shifting means comprises a multiplier connected between a resource mapping unit and, via a second IDFT unit and a second cyclic prefix adder, a second output of a dual uplink transmitter of the baseband unit of the modem.

The modem of the terminal according to the invention is adapted to generate a first uplink transmission signal for feeding to a first antenna; the controller of the terminal is operative to define a first uplink transmission direction for transmission of traffic data and to supply phase shift information to the phase shifting means; the phase shifting means of the terminal is adapted to generate a second transmit signal as a phase shifted version of the first transmit signal for feeding to a second antenna; and the first and second antennas are adapted to simultaneously emit the first and second signals, respectively, such that the signals combine constructively to form a beam pattern with the beam directed towards the first uplink transmission direction defined by the controller. In a preferred embodiment, the antennas of the terminal are arranged with a spacing of about $\lambda/2$, where $\lambda$ is the wavelength corresponding to the transmission frequency of the terminal. In particular, the spacing is set in correspondence to a frequency within the range of the transmission frequency bandwidth of the terminal.

The terminal according to one embodiment further comprises a database, and the controller of the terminal is further operative to define a second uplink transmission direction; calculate a transmission quality metric from code rate, bit rate and modulation scheme for the first and second uplink transmission directions and store the metrics together with an associated transmit power level in the database; and to compare a metric to transmit power ratio for the first and second uplink transmission direction and select that direction for transmitting traffic data for which this ratio is lowest.

In an alternative, preferred embodiment of a method for uplink data transmission in an LTE compliant TDD or FDD communication system the step of determining a transmission quality metric may comprise transmitting a sounding reference signal (SRS) by the terminal towards the first uplink transmission direction, and alternately, transmitting an SRS towards the second uplink transmission direction by the terminal; calculating a metric in function of the reception quality at the base station, for both the SRS transmitted by the terminal towards the first uplink transmission direction, and the SRS transmitted by the terminal towards the second uplink transmission direction, by the base station. In this embodiment the method further comprises comparing the metrics in the base station, and, if the metric for the second uplink transmission direction is better than that for the first uplink transmission direction, transmitting a switching signal from the base station to the terminal. In response to reception of the switching signal at the terminal, the method comprises replacing the first uplink transmission direction by the second uplink transmission direction and starting to transmit traffic data towards the second uplink transmission direction; and selecting a third uplink transmission direction for transmitting an SRS alternately with an SRS towards the second uplink transmission direction. If no switching signal is received by the terminal until a timer expires, the method continues transmission of traffic data towards the first uplink transmission direction and selecting a third direction as a new alternative direction for transmitting an SRS alternately with the SRS towards the first uplink transmission direction.

The invention further provides a wireless communication terminal and a base station which are adapted to support the embodiment of the method for uplink data transmission described above.

For the purpose of the invention the term "beam-forming" is intended to refer to any manner of electronically simulating a large directional antenna by combining radio signals of a set of small non-directional antennas. Any methods of such beam-forming known from the prior art are intended to be incorporated in the invention. For example, besides modification of the transmit signal in phase, the signal may additionally modified in amplitude, to produce a second signal to be combined with the transmit signal to produce a beam pattern with the beam directed in a predefined direction.

The invention is particularly useful for residential gateways for rural areas but will also find application in mobile LTE user equipment such as communication devices in laptop computers, PDAs, mobile phones, vehicles and the like.

BRIEF DESCRIPTION OF THE DRAWINGS

Additional features and advantages of the present invention will be apparent from the following detailed description of specific embodiments which is given by way of example only and in which reference will be made to the accompanying drawings, wherein.

DETAILED DESCRIPTION OF PREFERRED EMBODIMENTS

The LTE standard offers two major LTE modes, LTE for frequency division duplexing (LTE FDD) and LTE for time division duplexing (LTE TDD). In frequency division duplexing, uplink and downlink are separated in the frequency domain and the LTE modem can transmit and receive simultaneously. In time division duplexing, the same frequency band is used for uplink and downlink, where different time intervals are allocated by the base station for uplink and downlink, respectively.

Figure 4:
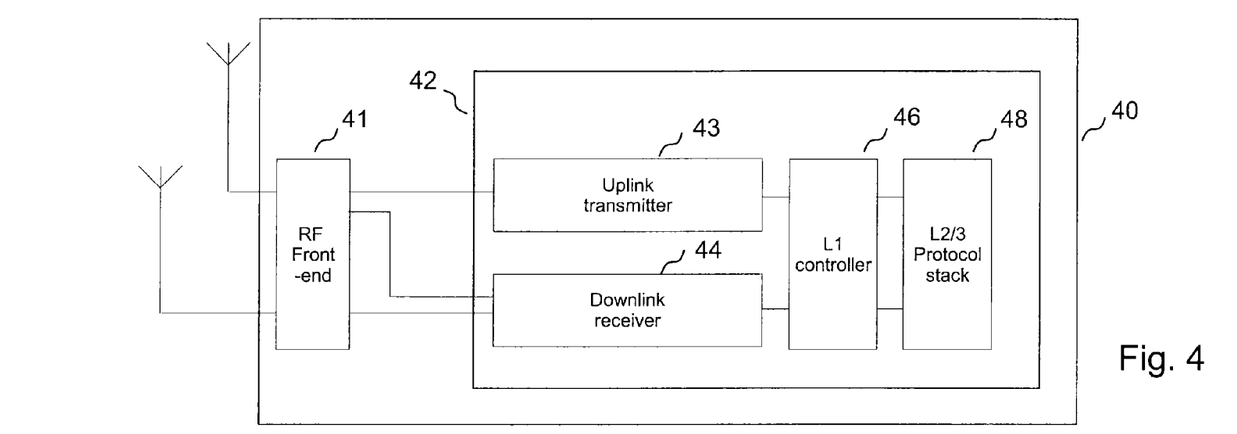
FIG. 4 shows a conventional LTE modem architecture which may be used in wireless terminals.

FIG. 4 shows a typical LTE FDD modem architecture 40 for wireless user equipment which comprises an RF front-end 41 and a baseband unit 42. Baseband unit 42 comprises an uplink transmitter 43, a downlink receiver 44, a layer 1 controller 46 and a layer 2/3 controller 48. "Layer" herein refers to the respective layer of the OSI 7 Layer Reference Model widely used in the art to classify network architectures, in which layer 1 is known as physical layer and layer 2 and 3 are known as data link layer and network layer, respectively.

Layer 1 controller 46 is responsible for controlling the uplink transmitter and the downlink receiver. It also interfaces to the layer 2 (in particular Media Access Control (MAC)) and layer 3 (in particular Radio Resource control (RRC)). Layer 1 controller 46 is aware of all power control bits sent by the base station, and the actual transmit power level as well as the modulation used for the uplink signal. Layer 2/3 controller 48 is responsible for processing the protocol stack.

RF front-end unit 41 of modem 40 generally supports one transmit path and two receive paths. Front-end unit 41 is adapted to receive two received (Rx) signals from two RF antennas and to convert it to baseband frequencies for supply to downlink receiver 44 for further processing. Also, front-end unit 41 is adapted to concurrently receive a baseband transmit (Tx) signal from uplink transmitter 43, to convert it to RF, to amplify it and then place it on one of the two RF antennas for emission. To this end, front-end unit 41 comprises one or more transceivers, power amplifiers, switches, diplexers, filters and so forth. As mentioned before, conventional LTE FDD user equipment typically uses both RF antennas for reception and at least one of the pair of RF antennas for transmission. Further, the LTE standard and some LTE FDD user equipment support switching of the transmit antenna, i.e. the front end can be adapted to switch from one RF antenna to the other one in response to antenna switching signaling received from the base station.

A conventional LTE FDD front-end unit substantially comprises an FDD duplexer connected between a switch on the antenna's side and both a transmit path and two receive paths, wherein the transmit path further comprises a power amplifier section and filters such as a noise filter. The diplexer allows the user equipment to send and to receive at the same time by operating downlink receiver 44 and uplink transmitter 43 at slightly different frequencies.

Figure 5:
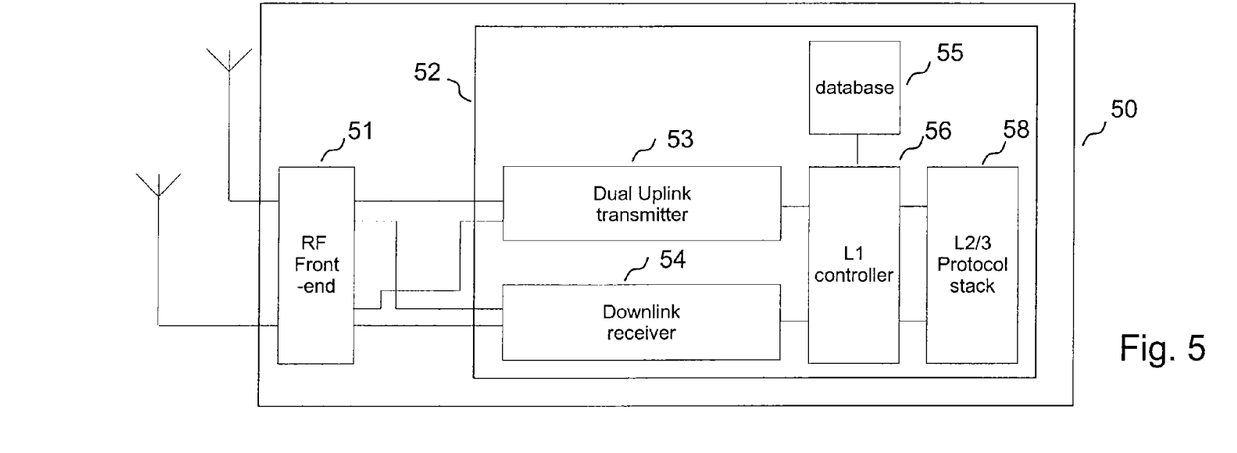
FIG. 5 shows an LTE modem architecture for wireless terminals supporting beam-forming in the uplink according to the invention.

FIG. 5 shows a modem architecture 50 modified to support uplink beam-forming according to the invention. Here, a dual uplink transmitter 53 of base band unit 52 and RF front-end unit 51 are adapted to support simultaneous emission of a transmit signal and a phase-shifted version of the same transmit signal, respectively, over the pair of RF antennas, i.e. both antennas are used for transmission. Embodiments of dual uplink transmitter 53 will be discussed in detail with reference to FIGS. 6 and 8. RF front-end unit 51 accepts two baseband transmit signals, Tx1 and Tx2, which are converted to RF, amplified and then placed on the two RF antennas. To this end, front-end unit 51 comprises at least two transmit paths each including at least one transceiver, power amplifier, diplexer, and switches and filters etc., which adds some complexity to front-end unit 51, primarily due to the second power amplifier required. As mentioned before, conventional LTE FDD user equipment typically uses both RF antennas for reception and only one of the pair of RF antennas for transmission. Downlink receiver 54 can be designed similar to downlink receiver 44 of FIG. 4, and, as it is not a subject of the invention, will not be described here in further detail.

L1 controller 56 and L2/3 controller 58 are designed to provide the same functions as L1 controller 46 and L2/3 controller 48, respectively, of FIG. 4. Additionally, L1 controller 56 and/or L2/3 controller 58 are designed to be operable to perform the method of selecting beam-forming patterns according to the invention which will be described in detail in conjunction with FIGS. 9 and 10. Optionally, the modem of FIG. 5 may comprise a database 55 in communication with L1 controller 56, as illustrated in the figure, and/or with L2/3 controller 58. Database 55 can be used for storing beam pattern information such as beam-forming phase vectors, transmit power levels associated therewith, quality metrics, probability figures etc, as will be detailed below.

Figure 6:
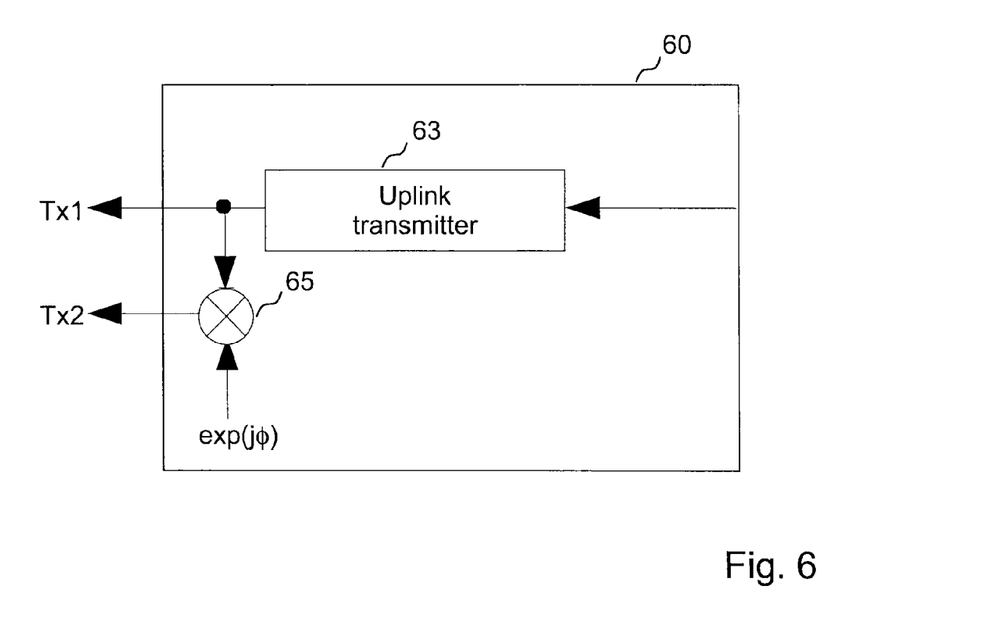
FIG. 6 shows a simple dual uplink transmitter implementing beam-forming according to the invention.

In its simplest form, as illustrated in FIG. 6, a dual uplink transmitter 60 comprises an uplink transmitter 63 which can be designed similar to conventional uplink transmitter 43 of FIG. 4, and which generates a transmit signal Tx1 in similar manner as described below with reference to FIG. 7.

Figure 7:
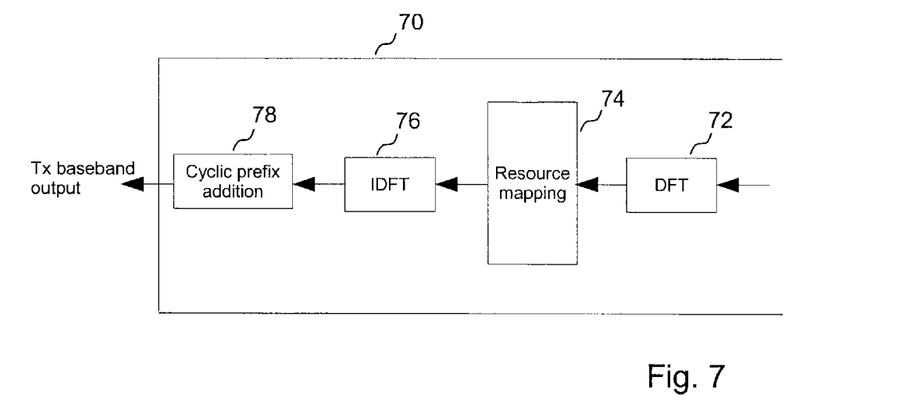
FIG. 7 illustrates conventional SC-FDMA signal generation.

FIG. 7 shows the last signal processing stages of a conventional uplink transmitter 70 such as uplink transmitter 43 of FIG. 4. A SC-FDMA signal is generated by first performing a discrete Fourier transform (DFT) 72 on the subcarriers that are allocated to the transmitting terminal. Then, a resource mapper 74 maps the DFT output to the number of input elements of an input vector for an inverse discrete Fourier transform (IDFT) 76 where the elements which are not used are filled with zeros. To complete the uplink signal generation, a cyclic prefix is added (78).

Returning to FIG. 6, additional to generating a transmit signal Tx1, dual uplink transmitter 60 generates a second transmit signal Tx2 by adding a phase to the first transmit signal to obtain a phase shifted version of the first transmit signal Tx1. This is done in the digital domain by multiplying the complex IQ transmit signal with a complex exponential, as shown at 65.

This simple method of beam steering, however, does not account for the bandwidth of the LTE frequency band which actually may comprise up to 1200 subcarriers, wherein the number of non-zero subcarriers, i.e. the subcarriers being used, depends on the transfer rate. As the LTE signal can span several MHz, and the optimum antenna direction may be frequency dependent due to the frequency-selective nature of the propagation channel, exactly steering a transmission signal into a defined direction would require aligning each of a plurality of individual occupied subcarriers in the predefined direction. In an embodiment of the invention, this is done in the uplink transmitter by multiplying a phase vector with the occupied subcarriers before performing inverse discrete Fourier transform (IDFT).

Figure 8:
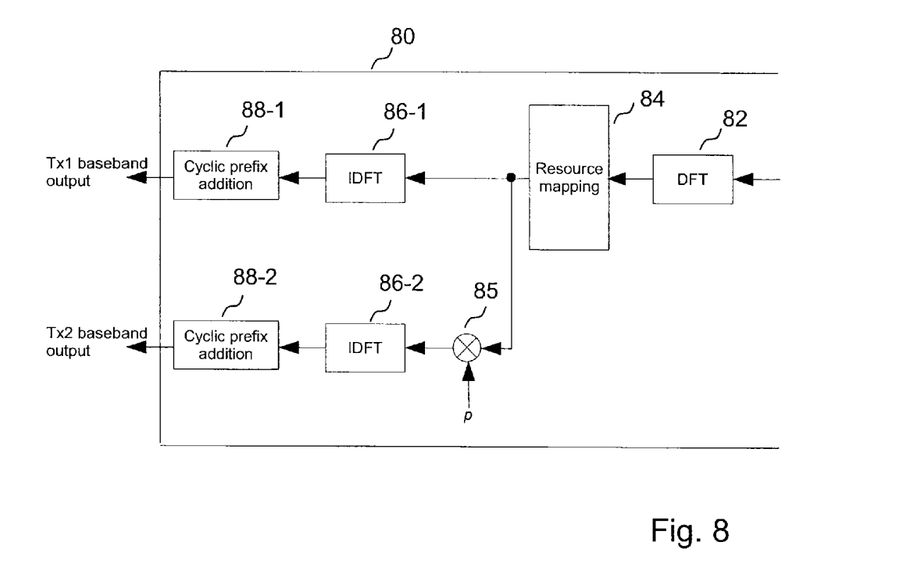
FIG. 8 shows frequency selective phase adjustment in SC-FDMA according to the invention.

This is illustrated in FIG. 8 which shows a modification of the conventional uplink transmitter of FIG. 7. Dual uplink transmitter 80 of FIG. 8 according to the invention comprises similar operational units as explained with reference to FIG. 7 which are designated with an analog reference numeral. Additionally, dual uplink transmitter 80 comprises a second signal generating branch including IDFT unit 86-2 and cyclic prefix addition unit 88-2, and a multiplier 85 connected between resource mapping unit 84 and this second signal generating branch.

For controlling the phase of a second transmit signal Tx2, a phase vector of the form $p=[e^{j\Phi_0}, e^{j\Phi_1}, \ldots, e^{j\Phi_{N-1}}]$ is multiplied at 85 with the signal output from resource mapping unit 84 before the generation of the IDFT at 86-2, wherein N is the size of the IDFT. In this manner, dual uplink transmitter 80 of FIG. 8 allows for setting the optimum phase for each carrier that is associated with each IDFT input. The phase vector has to be continuous, in other words it can have a rectilinear, curved saw-tooth-like and other forms, but must not have any jump-discontinuities.

In a special aspect, the invention relates to the manner to steer the beam formed by the pair of antennas in an optimal direction, where the challenge at the terminal's side being to find out in which direction to steer the beam for optimal uplink performance without getting any direct feedback information from the base station.

In a preferred embodiment, the invention proposes an algorithm for beam steering which does not require any modification at the base station's side for the terminal to steer the beam in an optimal direction. Here, the invention makes use of power control provided by the LTE standard. As mentioned above, uplink power control in LTE is conducted by the base station and aims at receiving a respective terminal's signal with the minimum signal strength required for error-free detection.

Assuming that the base station works at a reception level that is close to the sensitivity limit, for quasi stationary conditions the transmit power level should be proportional to the required energy per bit. According to an embodiment of the invention, layer 1 controller 56 of FIG. 5 is notified by layer 2/3 protocol stack controller 58 about the number of bits sent and the code rate, and a stationary terminal can make use of this information to steer a beam formed by the transmit antennas to the best possible direction for the base station without additional signaling from the base station, as follows: For each transport block sent, layer 1 controller 56 estimates the required energy per bit from the number of information bits in the transport block, the code rate, and the modulation format. The modem records the estimated required energy per bit values together with the signal power and the steering information for each subframe.

The recording is done over multiple angles and then the angle that offers the lowest energy per bit to transmission power ratio is selected, e.g. in database 55 of FIG. 5.

Figure 9:
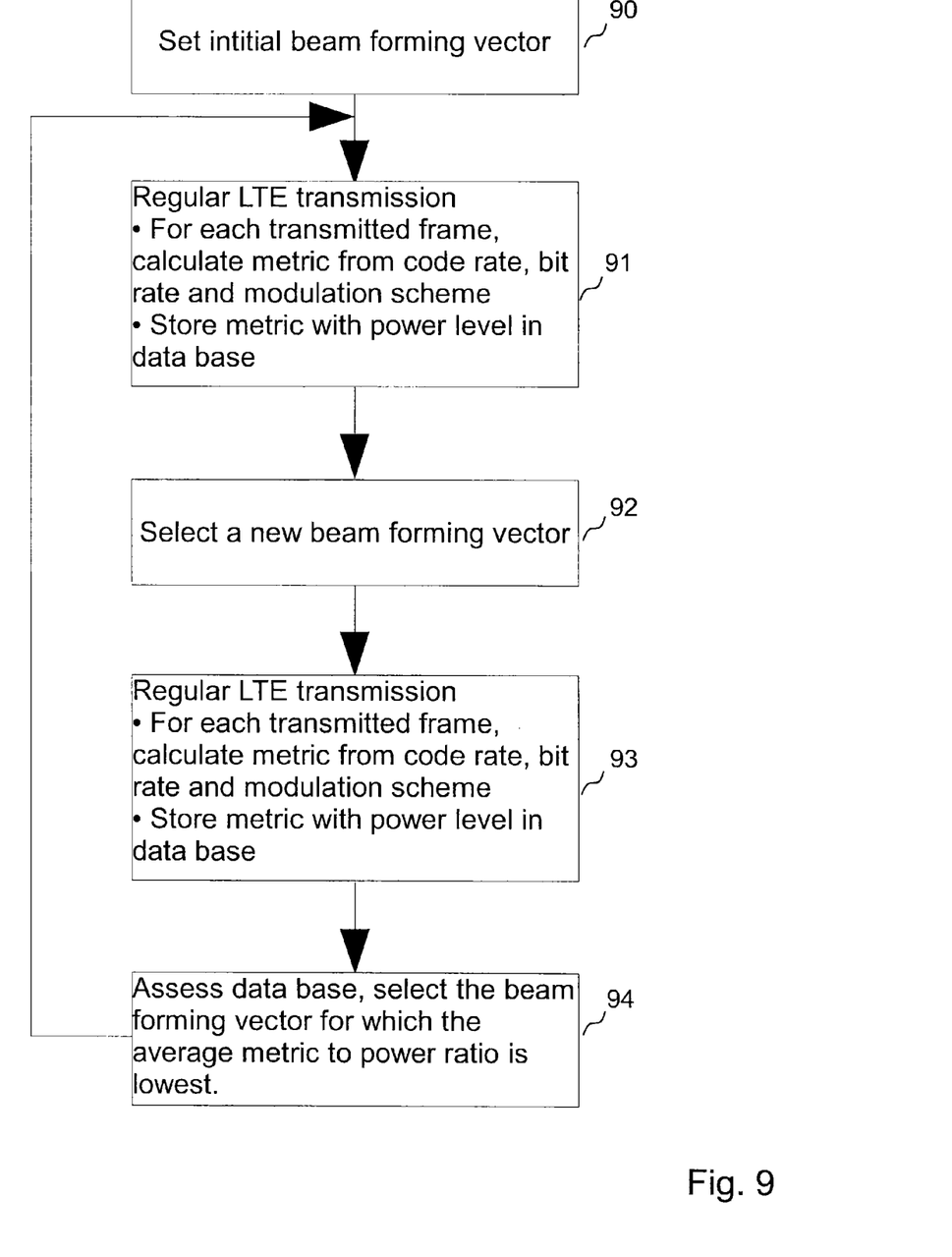
FIG. 9 shows a flow chart of one embodiment of an uplink beam-forming pattern selection algorithm of the invention.

A general form of a beam-steering algorithm controlled by layer 1 controller of modem 50 is shown in FIG. 9. This method can be performed with both an FDD and a TDD communication scheme. In block 90, an initial beam-forming vector is set. In block 91, regular LTE transmissions are performed applying this vector. For each frame that is sent, a metric is calculated from the code rate, bit rate and modulation scheme. For example, this metric could be the required energy per bit for quasi error free detection in flat fading channels. In any case, the metric is stored along with the transmission power of that frame in a database such as database 55 of FIG. 5. As the base station regulates the transmit power of the terminal, the transmission power will be adapted to the link quality.

After a few frames, the terminal selects a different beam-forming vector, as depicted in block 92. In block 93, regular LTE transmission continues with this new vector applied. Again, metrics are computed and stored in database 55. After a few frames, the database is assessed and the beam-forming vector that has the lowest metric to transmit power ratio is selected as a new initial vector, as shown in block 94. Then, the algorithm returns to block 91.

Several modifications of this algorithm are considered. In a first modification, the beam-forming vectors are randomly selected from a set of beam-forming vectors stored in database 55 of FIG. 5. Beam-forming vectors that have shown quality metrics to transmit power ratios are assigned a higher likelihood in the random selection process.

In a second modification, a set of beam-forming vectors is pre-computed and the beam-forming vectors are sorted according to an increasing or decreasing angle. Each new beam-forming vector that is tried out is randomly or alternating selected from the two nearest neighbors. This method steers the beam to the direction where the link quality is best.

In another embodiment, the beam-forming vector is iteratively determined by calculation with the angle as a parameter. The angle is then slightly modified from one iteration to the next. Depending on the resulting regulated transmit power, the angle is then further increased, or is set back to the original value and then decreased.

For LTE-TDD, as uplink and downlink share the same frequency band, the terminal can calculate the optimum beam direction directly from the received signal. That is, the LTE compliant terminal sets uplink beam-forming in the same direction as the main direction of the received signal. However, this is only possible in the case the base station uses the same antennas for transmitting and receiving. Moreover, this direction estimation method might imply more complexity than the methods of iterative beam steering discussed before.

Figure 10:
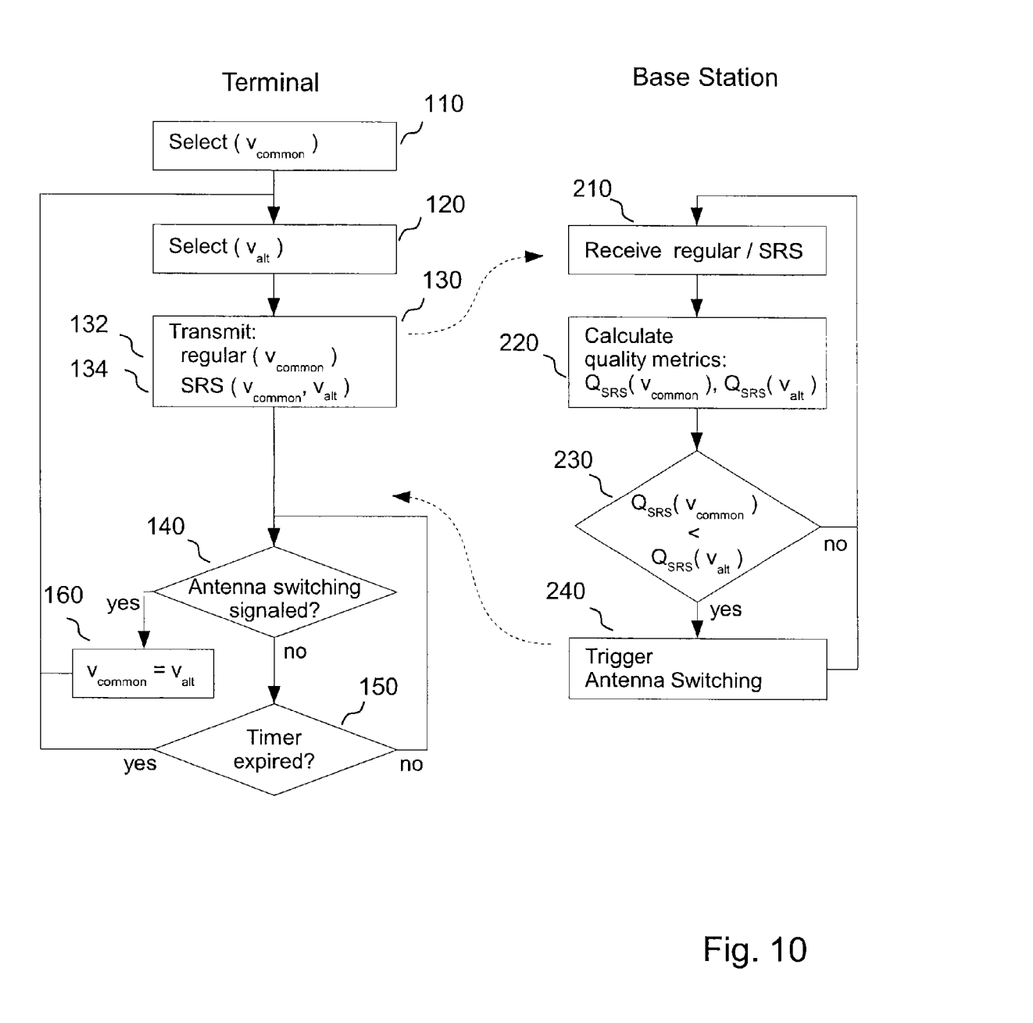
FIG. 10 is a flow chart of another uplink beam-forming pattern selection algorithm of the invention, using SRS.

FIG. 10 shows a flow chart of a different embodiment of an algorithm for steering a transmission beam in an optimal direction which can be used both for FDD and TDD communication schemes. This selection algorithm makes use of the channel sounding technique defined by the LTE standard. According to this channel sounding technique, the terminal periodically sends a sounding reference signal (SRS) in the entire or in a part of the frequency range which signal is known to the base station. The base station evaluates the SRS received by a terminal for allocating an optimal subcarrier to be used for uplink transmissions by this terminal. A preferred embodiment of the invention uses these SRSs to probe beamforming patterns and to find the optimal direction where to steer the beam to.

Especially, uplink channel sounding via SRS and LTE procedures for antenna switching are exploited to perform closed loop beam-forming control, as will be explained in detail with reference to FIG. 10. In contrast to the uplink beam-steering method of FIG. 9, the method of FIG. 10 requires provisions to be made in the base station, to support the algorithm as detailed below.

A common beam-forming vector is initially set in block 110. The "common" beam-forming vector herein is the vector which is applied at 85 of FIG. 8 to form a beam pattern in a specific direction for transmitting uplink traffic data. An alternative beam-forming vector is chosen in block 120. In block 130, the terminal starts transmission. Regular LTE transmission (132) of traffic data is performed using the common beam-forming vector set in block 110. In addition to traffic data, the terminal periodically transmits sounding reference signals (SRS) 134 wherein the terminal switches between two beam-forming vectors, the common beam-forming vector and the alternative beam-forming vector which yields a different angle of the beam. Here, the mapping pattern in time must be known to the base station.

In block 210 the base station receives both regular traffic and the SRS modulated with the common and the alternative beam-forming vector, respectively. In block 220 the base station calculates a quality metric from channel quality measurements for both SRS received. In decision block 230 the base station compares the metrics calculated for the common and the alternative beam-forming vector, respectively, and decides whether to proceed with the common or to proceed with the alternative beam-forming vector.

If the quality metric of the SRS modulated with the alternative vector is better than that of the SRS modulated with the common vector, in other words if the alternative vector yields a better performance, the base station triggers the use of this vector for subsequent transmissions. This is done by employing antenna switch signaling provided by the LTE standard. Thus, the base station sends an antenna switching request to the terminal, in block 240. Then, control is returned to block 210. If the common beam-forming vector provides better metrics, i.e. the answer in decision block 230 is "no", no antenna switching will be signaled, and control is returned to block 210.

At the terminal's side, in block 140 the terminal monitors the signaling from the base station for an antenna switching request. If an antenna switching request is received, i.e. the answer in decision block 140 is "yes", the terminal replaces the common vector used for traffic transmissions so far, by the alternative vector, in block 160. Then, control is returned to block 120 which defines a new alternative vector, and in block 130 regular LTE transmissions are continued with the new common vector such as defined in block 160, and SRS transmissions are continued with, alternately, the new common vector and the new alternative vector.

If, however, the answer in decision block 140 is "no", i.e. the terminal receives no antenna switching request from the base station, then in decision block 150 the terminal determines if a timer has expired which timer defines a certain time after which the alternative vector expires. If the timer has not yet expired, the terminal continues to monitor the signaling from the base station for an antenna switching request. When the timer expires in block 150, processing continues with block 120 where a new alternative vector is defined, and in block 130 regular LTE transmissions are continued with the old common vector, and SRS transmissions are continued with, alternately, the old common vector and the new alternative vector.

The algorithm of FIG. 10 is particularly advantageous since:

(1) The control loop solely relies on measurements available in standard LTE base stations;
(2) Signalization uses standard LTE features;
(3) The loop remains under direct control of the base station;
(4) In regular LTE uplink transmissions, phase changes will only occur at times known to the base station. This enables beam variations of arbitrary step size without degrading performance of regular transmissions.

A number of combinations of the algorithms illustrated in FIGS. 9 and 10 are also contemplated. According to one embodiment of the invention, a wireless communication terminal is designed to support both of the preferred beam steering algorithms described in conjunction with FIGS. 9 and 10. As such, the terminal may perform the beam steering algorithm of FIG. 10, and in the case of no response from the base station, may assume that the base station does not support this beam steering algorithm and skip to the beam steering algorithm of FIG. 9 which functions without any support by the base station other than that mandatory defined by the LTE standard.

In another modification, a terminal according to the invention can perform both beam steering algorithms of FIGS. 9 and 10 simultaneously. In this case, the incremental steps of the autonomous algorithm illustrated in FIG. 9 will be small, and/or the algorithm of FIG. 9 will be cut off following reception of a switching command of the FIG. 10 algorithm from the base station.

In a further alternative, a second timer can be provided which defines a time to skip from the algorithm of FIG. 10 to the algorithm of FIG. 9 in the case of no response from the base station.

In yet another embodiment, the algorithms of FIGS. 9 and 10 are combined in a way that the base station is not required to support multiple UE transmit antennas. The UE, or terminal, autonomously probes different transmit directions without any modifications required in the base station, as is the case with the algorithm of FIG. 9, but employs SRS sounding to try out different beam-forming vectors, as is the case with the algorithm of FIG. 10. In particular, the terminal initially transmits both, regular traffic data and a sounding reference signal (SRS), towards a first direction, i.e. employing the same beam-forming vector. After a predetermined interval, e.g. the order of 1 sec., the terminal changes the beam-forming vector used for transmitting an SRS. In this manner, the terminals tries out different transmit directions for the SRS while continuing to transmit traffic data towards the first direction. The base station monitors the SRS received from that terminal, and in case it sees a better reception quality of the SRS in a different frequency range from that currently allocated to that terminal, it will allocate that other frequency range to the terminal to be used for uplink transmission by the terminal. In response to a frequency switching request received from the base station, the terminal will not only change to the frequency range allocated by the base station, but according to the invention will additionally change to that different beam-forming vector used to transmit the most recent SRS and will start to transmit traffic data towards that new direction. Then, the terminal continues to probe different transmit direction by changing to a new beam-forming vector for transmitting SRS. As with the algorithm of FIG. 9, the terminal monitors quality metrics for each transmission in function of the respective beam-forming vector and frequency range. The terminal stores the results in a database such that the data base contains the quality metrics over all probed beam angles in association with the respective frequency range allocated by the base station. In fact, with this embodiment the terminal selects the beam pattern for the SRS to probe a new hypothesis, and the base station indirectly, and unconsciously, selects this new hypothesis in case it sees a better uplink performance in a different frequency range. By employing the performance results from the database for choosing a new direction, the transmission beam can be iteratively steered to an optimal transmit direction.

The beam steering algorithms of the invention presumes a quasi stationary channel which is to say a channel that does not change considerably within a period in the order of some seconds or some ten seconds. This is particularly given for residential gateways that provide wireless access to communication networks in rural areas, but can also be useful in mobile LTE user equipment such as communication devices in laptop computers, PDAs, mobile phones, vehicles etc. when used under quasi stationary conditions.

The invention claimed is:

1. A method for uplink data transmission in a Long Term Evolution (LTE) compliant communication system which comprises a base station and at least one wireless communication terminal, wherein the base station transmits individual power control signals to each of said at least one terminal to control uplink transmit power of the at least one terminal to a minimal power required for error-free detection of the uplink signal, and wherein said at least one terminal comprises a modem including an RF front-end, a baseband unit, and at least two antennas, said modem being adapted to support simultaneous reception over the at least two antennas, and said modem is further adapted to support simultaneous transmission over the at least two antennas, the method comprising:

defining a first uplink transmission direction for transmitting traffic data;

generating an uplink transmission signal; emitting said uplink transmission signal in a beam pattern with a beam directed towards said first uplink transmission direction by:

feeding said uplink transmission signal as a first transmit signal Tx1 to a first antenna of the at least one terminal, generating a second transmit signal Tx2 as a phase shifted version of the first transmit signal and feeding said second transmit signal to a second antenna of the at least one terminal, wherein phase shift of the second signal is adapted such that the first and second signals emitted by the first and second antennas, respectively, combine constructively to form a beam pattern with the beam directed towards said first uplink transmission direction;

defining a second uplink transmission direction;

determining a transmission quality metric from performance characteristics for said first and said second uplink transmission directions; and evaluating said transmission quality metrics by the base station and/or by the at least one terminal in function of the uplink transmit power dictated by the base station, and if the metric for said second uplink transmission direction is better than the metric for said first uplink transmission direction, replacing said first uplink transmission direction by said second uplink transmission direction and starting to transmit traffic data towards said second uplink transmission direction.

2. The method of claim 1, wherein the step of generating the second transmit signal Tx2 comprises multiplying the first signal with a complex exponential following a cyclic prefix adding step in the baseband unit of the terminal.

3. The method of claim 1, wherein the step of generating the second transmit signal Tx2 comprises multiplying a signal output from a resource mapping step in the baseband unit of the terminal by a phase vector of form p=[ej$\phi$0, ej$\phi$1, ..., ej$\phi$N−1] prior to an IDFT generation step, wherein N is the size of the IDFT.

4. The method according to claim 1, which method is employed with a time division duplex (TDD) communication scheme, wherein said first uplink transmission direction for transmitting traffic data is defined as a main direction of a signal received from the base station.

5. The method of claim 1, wherein the step of determining a transmission quality metric comprises calculating a metric from code rate, bit rate and modulation scheme in the at least one wireless communication terminal;

the method further comprising:

storing said metric together with the associated transmit power dictated by the base station in a data base of the terminal; and wherein the evaluating step comprises:

comparing a metric to transmit power ratio for said first and second uplink transmission directions and selecting that direction for transmitting traffic data for which this ratio is lowest.

6. The method of claim 1, wherein the step of determining a transmission quality metric comprises:

transmitting a sounding reference signal (SRS) by the at least one terminal towards said first uplink transmission direction, and alternately, transmitting an SRS towards said second uplink transmission direction by the at least one terminal;

calculating a metric in function of reception quality at the base station, for both the SRS transmitted by the at least one terminal towards said first uplink transmission direction, and the SRS transmitted by the at least one terminal towards said second uplink transmission direction, by the base station;

and wherein the method further comprises:

comparing said metrics in the base station, and if the metric for said second uplink transmission direction is better than the metric for said first uplink transmission direction, transmitting a switching signal from the base station to said at least one terminal;

in response to reception of said switching signal at the terminal, replacing said first uplink transmission direction by said second uplink transmission direction and starting to transmit traffic data towards said second uplink transmission direction; and selecting a third uplink transmission direction for transmitting an SRS alternately with an SRS towards said second uplink transmission direction; and if no switching signal is received by the terminal until a timer expires, continuing transmission of traffic data towards said first uplink transmission direction and selecting a third direction as a new alternative direction for transmitting an SRS alternately with the SRS towards said first uplink transmission direction.

7. The method of claim 1, further comprising, within the at least one terminal, the steps of:

defining a second direction;

transmitting a sounding reference signal (SRS) towards said second direction;

listening for a frequency switching signal from the base station;

in response to a frequency switching signal received from the base station, switching to a frequency allocated by the base station and replacing said first uplink transmission direction by said second direction to start to transmit traffic data towards said second direction; and if no switching signal is received until a timer expires, continuing to transmit traffic data towards said first uplink transmission direction and defining a third direction for transmitting an SRS.

8. The method of claim 7, further comprising:

determining transmission quality metrics from code rate, bit rate and modulation scheme for each of said uplink transmission directions and storing said metrics in a data base of the at least one terminal, in association with the respective uplink transmission direction and together with the associated frequency range allocated by the base station; and defining a next direction for transmitting an SRS using said database.

9. A wireless communication terminal in a Long Term Evolution (LTE) compliant communication system which comprises a base station and a plurality of terminals, wherein the base station transmits an individual power control signal to each terminal of said terminals to control uplink transmit power of said terminal to a minimal power required for error-free detection of the uplink signal, said terminal comprising a modem including an RF front-end and a baseband unit, and at least two antennas, said baseband unit including a downlink receiver, an uplink transmitter, at least one controller, and said modem being adapted to support simultaneous reception over the at least two antennas, wherein said modem further comprises at least two transmit paths to support simultaneous transmission over the at least two antennas, and phase shifting means; and said modem generates a first uplink transmission signal for feeding to a first antenna;

said controller is operative to define a first uplink transmission direction for transmission of traffic data and to supply phase shift information to said phase shifting means;

said phase shifting means generates a second transmit signal as a phase shifted version of said first transmit signal for feeding to a second antenna; and said first and second antennas are adapted to simultaneously emit said first and second signals, respectively, such that the signals combine constructively to form a beam pattern with a beam directed towards said first uplink transmission direction defined by the controller, wherein said controller is further operative to:

define a second uplink transmission direction;

calculate a transmission quality metric from code rate, bit rate and modulation scheme for said first and second uplink transmission directions, and store said metrics together with an associated transmit power level in said database;

compare a metric to transmit power ratio for said first and second uplink transmission direction and select that direction for transmitting traffic data for which this ratio is lowest;

transmit a sounding reference signal (SRS) towards said first uplink transmission direction, and alternately, transmit an SRS towards said second uplink transmission direction;

listen for a switching signal from the base station;

in response to a switching signal received from the base station, replace first uplink transmission direction by said second uplink transmission direction to start to transmit traffic data towards said second uplink transmission direction; and if no switching signal is received until a timer expires, continue to transmit traffic data towards said first uplink transmission direction and select a third direction as a new alternative direction for transmitting an SRS alternately with the SRS towards said first uplink transmission direction.

10. The terminal of claim 9, wherein said antennas are spaced by about $\lambda/2$, with $\lambda$ being a wavelength corresponding to a transmission frequency of the terminal.

11. The terminal of claim 9, wherein said phase shifting means comprise a multiplier connected between a cyclic prefix adder and a second output of a dual uplink transmitter of said baseband unit of the modem.

12. The terminal of claim 9, wherein said phase shifting means comprise a multiplier connected between a resource mapping unit and, via a second IDFT unit and a second cyclic prefix adder, a second output of a dual uplink transmitter of said baseband unit of the modem.

13. A base station in a Long Term Evolution (LTE) compliant communication system which comprises said base station and a plurality of wireless communication terminals according to claim 9, said base station comprising a base station controller operative to:

receive a first sounding reference signal (SRS) alternately with a second SRS from a first terminal;

calculate a transmission quality metric in function of the reception quality for both the first and second sounding reference signals;

compare said quality metrics; and if the quality metric for said second uplink transmission direction is better than the quality metric for said first uplink transmission direction, transmit a switching signal to said first terminal.

* * * * *